US008721428B2

(12) United States Patent
Fong et al.

(10) Patent No.: US 8,721,428 B2
(45) Date of Patent: May 13, 2014

(54) GAMING MACHINE WITH RANDOM SYMBOL SELECTION

(75) Inventors: Colin Fong, Lane Cove (AU); Raymond Maras, Lane Cove (AU); David Villa, Lane Cove (AU)

(73) Assignee: Aristocrat Technologies Australia Pty Ltd (AU)

( * ) Notice: Subject to any disclaimer, the term of this patent is extended or adjusted under 35 U.S.C. 154(b) by 0 days.

(21) Appl. No.: 13/543,163

(22) Filed: Jul. 6, 2012
(Under 37 CFR 1.47)

(65) Prior Publication Data

US 2013/0040726 A1 Feb. 14, 2013

Related U.S. Application Data

(62) Division of application No. 11/744,682, filed on May 4, 2007, now abandoned.

(30) Foreign Application Priority Data

May 5, 2006 (AU) ................................ 2006902365

(51) Int. Cl.
*A63F 13/10* (2006.01)
*A63F 13/00* (2006.01)
*G07F 17/32* (2006.01)
*G07F 17/34* (2006.01)

(52) U.S. Cl.
CPC .............. *G07F 17/32* (2013.01); *G07F 17/326* (2013.01); *G07F 17/3213* (2013.01); *G07F 17/3211* (2013.01); *G07F 17/3204* (2013.01); *G07F 17/3202* (2013.01); *G07F 17/3293* (2013.01); *G07F 17/34* (2013.01)
USPC .................................. 463/20; 463/13; 463/16

(58) Field of Classification Search
CPC ... G07F 17/32; G07F 17/326; G07F 17/3213; G07F 17/3211; G07F 17/3204; G07F 17/3202; G07F 17/3293; G07F 17/34
USPC ................................................ 463/13, 16, 20
See application file for complete search history.

(56) References Cited

U.S. PATENT DOCUMENTS

| | | | | | |
|---|---|---|---|---|---|
| 4,448,419 | A | * | 5/1984 | Telnaes | 463/21 |
| 5,085,436 | A | * | 2/1992 | Bennett | 463/21 |
| RE34,244 | E | * | 5/1993 | Hagiwara | 463/20 |
| 5,263,716 | A | * | 11/1993 | Smyth | 463/21 |
| 5,393,061 | A | * | 2/1995 | Manship et al. | 463/20 |
| 5,511,784 | A | * | 4/1996 | Furry et al. | 273/143 R |
| 5,697,843 | A | * | 12/1997 | Manship et al. | 463/20 |
| 5,704,835 | A | * | 1/1998 | Dietz, II | 463/20 |
| 5,725,428 | A | * | 3/1998 | Achmuller | 463/20 |

(Continued)

FOREIGN PATENT DOCUMENTS

AU 2005202478 A1 12/2005

*Primary Examiner* — William H McCulloch, Jr.
(74) *Attorney, Agent, or Firm* — McAndrews, Held & Malloy, Ltd.

(57) ABSTRACT

A gaming machine includes a display and a game controller that provides a wagering game in which a plurality of symbol display positions are provided on the display. When a player stakes a wager on the outcome of the wagering game the game controller selects symbols for display sequentially. The set of symbols is dynamic, wherein at least two symbols from the symbol set are changed between at least certain symbol selections depending on a characteristic of a symbol selected in a previous selection. The display positions may be arranged in rows and columns.

14 Claims, 5 Drawing Sheets

(56) References Cited

U.S. PATENT DOCUMENTS

| | | | | |
|---|---|---|---|---|
| 6,053,813 | A * | 4/2000 | Mathis | 463/26 |
| 6,093,102 | A * | 7/2000 | Bennett | 463/20 |
| 6,241,607 | B1 * | 6/2001 | Payne et al. | 463/20 |
| 6,261,178 | B1 * | 7/2001 | Bennett | 463/20 |
| 6,386,973 | B1 * | 5/2002 | Yoseloff | 463/13 |
| 6,413,162 | B1 * | 7/2002 | Baerlocher et al. | 463/20 |
| 6,572,471 | B1 * | 6/2003 | Bennett | 463/16 |
| 6,632,141 | B2 * | 10/2003 | Webb et al. | 463/25 |
| 6,652,377 | B1 * | 11/2003 | Moody | 463/13 |
| 6,705,614 | B1 * | 3/2004 | Kyle | 273/292 |
| 6,935,950 | B2 * | 8/2005 | Tarantino | 463/20 |
| 6,966,835 | B2 * | 11/2005 | Graham | 463/25 |
| 6,997,804 | B2 * | 2/2006 | Berman | 463/20 |
| 7,014,559 | B1 * | 3/2006 | Fong | 463/20 |
| 7,144,322 | B2 * | 12/2006 | Gomez et al. | 463/20 |
| 7,252,589 | B1 * | 8/2007 | Marks et al. | 463/16 |
| 7,410,420 | B2 * | 8/2008 | Shiraishi | 463/21 |
| 7,431,648 | B2 * | 10/2008 | Odom et al. | 463/21 |
| 7,690,983 | B2 * | 4/2010 | Hartl et al. | 463/20 |
| 7,749,063 | B2 * | 7/2010 | Belger et al. | 463/16 |
| 7,874,910 | B2 * | 1/2011 | Berman | 463/20 |
| 7,950,994 | B2 * | 5/2011 | Berman et al. | 463/20 |
| 8,096,869 | B2 * | 1/2012 | Yoshimi | 463/20 |
| 8,113,942 | B2 * | 2/2012 | Hoffman et al. | 463/20 |
| 8,152,623 | B2 * | 4/2012 | Fiden | 463/20 |
| 8,216,051 | B2 * | 7/2012 | Rasmussen | 463/20 |
| 8,226,466 | B2 * | 7/2012 | Roukis | 463/20 |
| 8,366,540 | B2 * | 2/2013 | Yoshimi | 463/20 |
| 8,444,473 | B2 * | 5/2013 | Ching et al. | 463/20 |
| 8,496,522 | B2 * | 7/2013 | Caputo et al. | 463/21 |
| 8,562,420 | B2 * | 10/2013 | Roukis | 463/20 |
| 8,574,059 | B2 * | 11/2013 | Rodgers et al. | 463/20 |
| 8,602,867 | B2 * | 12/2013 | Owen et al. | 463/20 |
| 8,602,871 | B2 * | 12/2013 | Wadleigh et al. | 463/20 |
| 2003/0064778 | A1 * | 4/2003 | Berman et al. | 463/20 |
| 2004/0043809 | A1 * | 3/2004 | Gomez et al. | 463/16 |
| 2004/0048651 | A1 * | 3/2004 | Vorias et al. | 463/20 |
| 2004/0063488 | A1 * | 4/2004 | Berman | 463/18 |
| 2004/0192431 | A1 * | 9/2004 | Singer et al. | 463/20 |
| 2004/0242315 | A1 * | 12/2004 | Paulsen et al. | 463/20 |
| 2005/0054418 | A1 * | 3/2005 | Baerlocher | 463/20 |
| 2005/0107150 | A1 * | 5/2005 | Moody | 463/16 |
| 2006/0148554 | A1 * | 7/2006 | Hornik et al. | 463/20 |
| 2006/0163816 | A1 * | 7/2006 | Moody | 273/292 |
| 2007/0178959 | A1 * | 8/2007 | Halprin | 463/20 |
| 2007/0254732 | A1 * | 11/2007 | Walker et al. | 463/16 |
| 2008/0026824 | A1 * | 1/2008 | Muir | 463/25 |
| 2008/0051174 | A1 * | 2/2008 | Fiden | 463/20 |
| 2008/0188278 | A1 * | 8/2008 | Paulsen et al. | 463/11 |
| 2009/0124342 | A1 * | 5/2009 | Fong | 463/20 |
| 2009/0166974 | A1 * | 7/2009 | Moody | 273/292 |
| 2012/0135797 | A1 * | 5/2012 | Muir | 463/20 |
| 2012/0329546 | A1 * | 12/2012 | Roukis | 463/20 |
| 2013/0184054 | A1 * | 7/2013 | Fong | 463/20 |

* cited by examiner

GAMING MACHINE WITH RANDOM SYMBOL SELECTION

RELATED APPLICATIONS

This application is a divisional of U.S. patent application Ser. No. 11/744,682 filed on May 4, 2007, which claims priority to an Australian patent application filed on May 5, 2006, as serial number AU2008901136, entitled "Gaming Machine with Random Symbol Selection," which is herein incorporated by reference herein in its entirety.

BACKGROUND OF THE INVENTION

The present invention relates to gaming apparatus and methods of gaming. In particular, the present invention relates to a gaming machine or system with a novel arrangement for symbol selection.

With the increase of gambling at gaming venues has come increased competition between gaming venues to obtain a larger share of the total gambling spend. Gaming venue operators have therefore continuously looked for new variations and types of games in order to attract both new and return customers to their venues.

In response to this need, suppliers of gaming devices and systems have attempted to provide the sought after variety, while still developing games that comply with the relevant regulations in the jurisdiction of the gaming venue operator. Suppliers of gaming devices therefore are faced with restrictions on the types of games and gaming apparatus that are allowable, both in terms of the prevailing regulations and in terms of providing a return on investment to the gaming venue operators.

In addition, it is important that a player be able to understand the operation of a game quickly so that the player promptly feels that they are in control of game play and can therefore extract maximum entertainment from the game.

One well known type of existing gaming machine incorporates spinning reels with pay lines. In recent years spinning reel games have typically comprised video screen displays which show simulations of spinning reels. A typical video spinning reel game will have say five spinning reels, and when the reels are at rest three symbol symbols from each real are shown on the screen, thus displaying a matrix of 3 by 5 symbols. Pay lines are defined through the symbols. Early machines had only limited numbers of pay lines, typically three horizontal pay lines through the three rows of symbols, but in recent years the advent of high speed computer processing has allowed far more complicated pay lines to be introduced, and indeed, machines with 50 or more pay lines are currently known.

Typical current spinning reel type machines do not have any vertical pay lines since the symbols on the reel are in a defined relationship relative to each other, that is, the symbols on each reel are in a pre-arranged relationship relative to each other, and there is therefore nothing random about which symbols are next to each other in any column of the machine. One prior art document, U.S. Pat. No. Re 34,244 (Hagiwara), discloses a somewhat different arrangement in which the symbols in a column are each defined by an independent spinning reel. Thus, each symbol position has its own spinning reel, and each spinning reel only displays one symbol. Hagiwara discloses a 3×3 matrix of symbols, thus requiring 9 spinning reels. It will be appreciated that the symbols displayed in a Hagiwara type device are limited to those symbols on the reels.

Any reference in this specification to the prior art does not constitute an admission that such prior art was well known or forms part of the common general knowledge in any jurisdiction.

SUMMARY OF THE INVENTION

According to a first aspect of the invention, there is provided a gaming machine comprising a display and a game controller that provides a wagering game in which:

a plurality of symbol display positions arranged in a plurality of columns are provided on the display; and when a player stakes a wager on an outcome of the wagering the game controller selects symbols from a set of symbols comprising a plurality of symbols according to a random selection process and the selected symbols are displayed in the display positions; and if a winning combination of symbols is displayed the gaming machine awards a prize;

wherein at least one column comprises at least two display positions and for each column having two or more display positions:

the game controller selects from an original set of symbols allocated to that column the symbols for display in a first display position and sequentially selects symbols for the other display positions in the column; and for each symbol selected after the selection for the first display position, the selection is made from a different set of symbols that is a modification of the original set of symbols, wherein the modification depends on a characteristic of the symbol selected in one or more previous selections;

and wherein at least one said winning combination of symbols comprises the display of particular symbols across the plurality of columns.

The at least one said winning combination of symbols may include the display of a particular combination of symbols formed by taking the symbol selected for any one and only one display position in each column.

In one embodiment, at least two of the columns comprise a different number of display positions.

In one embodiment, the number of display positions in a column that are active for defining a winning combination is variable depending on the particular wager staked by the player.

In one embodiment the original set of symbols includes a plurality of subsets of symbols, each said subset consisting of symbols that if displayed together across the plurality of columns would define a said winning combination, and wherein the modification of the original set of symbols includes either removing or changing all symbols in the same subset as the symbol selected in the one or more previous selections. At least one column may comprise at least three display positions and the modification to the set of symbols may be cumulative so that no two symbols from the same subset can appear in the same column.

In one embodiment, at least one column includes at least three display positions and wherein the modification of the original set of symbols for the selection of a symbol for the third and any subsequent symbols positions is cumulative of the modifications made for the preceding display positions.

According to a second aspect of the invention, there is provided a gaming machine comprising a display and a game controller that provides a wagering game in which a plurality of symbol display positions are provided on the display, and when a player stakes a wager on the outcome of the wagering game the game controller selects symbols from a set of symbols comprising a plurality of symbols according to a random selection process and the selected symbols are displayed in the display positions, and when a winning combination of symbols is displayed the gaming machine awards a prize to the player, the gaming machine being characterised in that the game controller selects at least two of the symbols sequentially and the set of symbols is dynamic, wherein at least two symbols from the symbol set are changed or removed between at least two successive symbol selections depending on a characteristic of a single symbol selected before the second of the two successive symbol selections.

In one embodiment, the set of symbols comprises a subset of symbols consisting of symbols that would define a said winning combination if displayed together in a predetermined arrangement of display positions, and wherein when said single symbol is a symbol from the subset of symbols, the symbols that are changed or removed comprise the symbols in the same subset. In this embodiment the set of symbols may comprise a plurality of said subsets of symbols and wherein when said single symbol is a symbol from one of the plurality subsets of symbols, the symbols that are changed comprise the symbols in the same subset. Also, the symbols that are changed may consist of the symbols in the same subset and no other symbols in the set of symbols are changed between the sequential selection of symbols.

In one embodiment, the dynamic change comprises the addition of symbols to the set of symbols between the sequential selections.

In one embodiment, the dynamic change comprises the altering of characteristics of symbols in the set between selections.

In one embodiment, the characteristic of said single symbol is its identity, and the set of symbols is changed by removing all symbols of that identity from the set of symbols prior to the next symbol selection.

According to a third aspect of the invention, there is provided a gaming machine comprising a display and a game controller for providing a wagering game in which a plurality of symbol display positions are provided on the display arranged in a matrix of m columns by n rows, and when a player stakes a wager on the outcome of a wagering game played on the system the game controller is arranged to play the wagering game in which symbols are randomly selected from a set of symbols and the selected symbols are displayed in the display positions, and if a winning combination of symbols is displayed a prize is awarded to the player, the gaming system being characterised in that the selection of each symbol in a column is independent of any other symbol selected in that column, and the set of symbols from which the symbols are selected changes as a consequence of each symbol selection made in a column.

In one embodiment the set of symbols from which the symbols are selected is changed so that it is not possible for a combination of symbols that represents a winning combination to be displayed in the display positions forming any one of the columns.

According to a fourth aspect of the invention, there is provided a gaming machine including a display and a game controller for providing a wagering game in which a plurality of symbol display positions are provided on the display, and when a player stakes a wager on the outcome of a wagering game played on the system the game controller is arranged to randomly select symbols from a set of symbols and display the selected symbols in the display positions, and if a winning combination of symbols is displayed the player is awarded a prize, the gaming machine being characterised in that:

at least some of the symbols in the set include members of a family of symbols;

the symbols are selected sequentially from a first symbol display position to a subsequent symbol display position; and the set of symbols from which each symbol is selected is altered for each selection after the first selection until said subsequent display position by removing from the set all those symbols belonging to a particular family if a symbol from that family was selected in a previous selection.

In one embodiment the symbol display positions are aligned in either a column or a row, and the first symbol display position is the first position in the column or row, and the subsequent symbol display position is the last symbol display position in the column or row.

In one embodiment the symbol display positions are arranged in an array of m columns by n rows, and the symbols are selected sequentially for the display positions in each column, the set of symbols for each column being at least substantially the same, winning outcomes comprising the selection of the same symbol in adjacent columns.

In one embodiment the number of symbol display positions in each column and/or each row depend on a characteristic of the wager which a player stakes on a game.

According to a fifth aspect of the present invention, there is provided a gaming machine including a display and a game controller for providing a wagering game in which a plurality of symbol display positions are provided on the display, and when a player stakes a wager on the outcome of a wagering game played on the system the game controller is arranged to randomly select symbols and display the selected symbols in the display positions, and if a winning combination of symbols is displayed the player is awarded a prize, the gaming machine being characterised in that:

the display positions are arranged in an array of m columns by n rows wherein m and n are greater than 1;

the symbol selected for display in each display position is individually selected from a set of symbols; and the set of symbols from which a symbol is selected for at least one of the display positions differs from the set of symbols from which a symbol is selected for another display position so that despite the individual selection of the symbol for each display position, it is either:

not possible to display a winning combination of symbols along any one of the columns and is possible to display a winning combination of symbols along any one of the rows; or not possible to display a winning combination of symbols along any one of the rows and is possible to display a winning combination of symbols along any one of the columns.

According to a sixth aspect of the invention, there is provided a method of providing a game in which a player stakes a wager on one or more of the outcomes and if a winning combination results in an outcome on which the player has staked a wager an award is awarded, the method comprising representing a plurality of the outcomes on an electronic display as symbols in a plurality of adjacent display positions comprising a first display position to an nth display position, using an electronic controller to sequentially select the symbols for display in each of the first display positions from a set of symbols that is modified during the selection process so that a winning combination defined by a plurality of adjacent symbols can not be defined across the first display positions, and repeating the sequential selection process for each of the 2nd to the nth display positions.

In one embodiment a further plurality of outcomes on which a player may stake a wager are defined by combinations of symbols from the 1st to nth display positions of the outcomes defined by a plurality of adjacent display positions, one and only one symbol used in each of the display positions.

In one embodiment the plurality of adjacent display positions comprising a first display position to an nth display position are displayed in columns with the display positions aligned so as to form a matrix of display positions having n rows and in columns and wherein the set of symbols is modified by removing from eligibility for selection any symbol that if selected for the current display position, would represent part or all of a winning combination of symbols together with a previously selected symbol for an adjacent display position in the same column.

In another embodiment the plurality of adjacent display positions comprising a first display position to an nth display position are displayed in rows with the display positions aligned so as to form a matrix of display positions having m rows and n columns and wherein the set of symbols is modified by removing from eligibility for selection any symbol that if selected for the current display position, would represent part or all of a winning combination of symbols together with a previously selected symbol for an adjacent display position in the same row.

Further aspects of the present invention will become apparent from the following description, given by way of example only and with reference to the accompanying drawings.

BRIEF DESCRIPTION OF THE DRAWINGS

Notwithstanding any other embodiments that may fall within the scope of the present invention, certain embodiments of the present invention will now be described, by way of example only, with reference to the accompanying figures.

DESCRIPTION OF THE INVENTION

Figure 1:
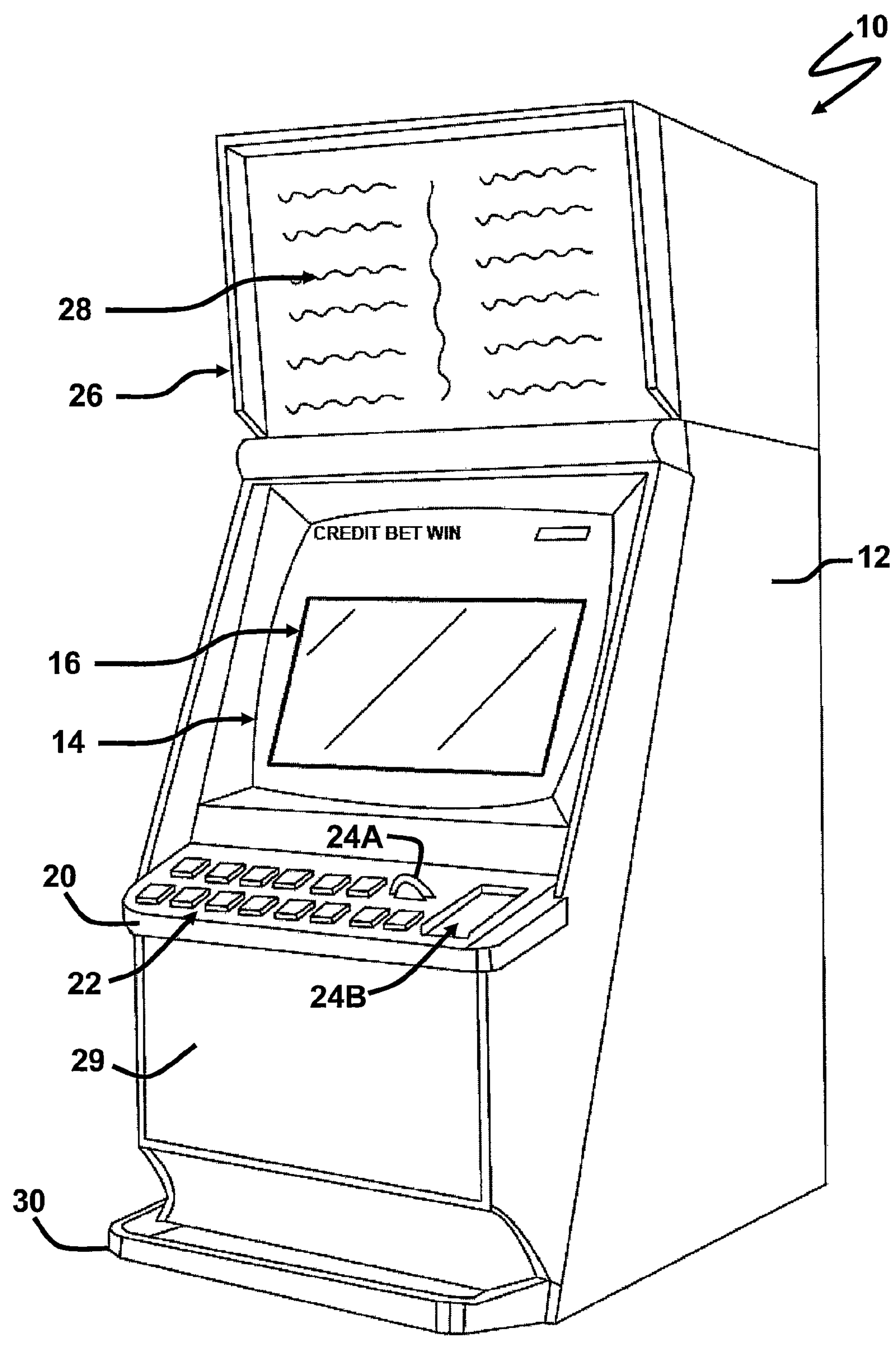
FIG. 1 shows diagrammatically, a view of a gaming machine suitable for implementing an embodiment of the present invention.

In FIG. 1 of the accompanying drawings, a gaming machine suitable for implementing the present invention is generally referenced by arrow 10. The gaming machine 10 is one example of a gaming apparatus that is suitable to implement embodiments of the present invention.

The gaming machine 10 includes a console 12 having a display 14 on which is displayed representations of a game 16, that can be played by a player. A mid-trim 20 of the gaming machine 10 houses a bank of buttons 22 for enabling a player to play the game 16. The mid-trim 20 also houses a credit input mechanism 24 including a coin input chute 24A and a bill collector 24B. A top box 26 may carry artwork 28, including for example, pay tables and details of bonus awards and other information or images relating to the game. Further artwork and/or information may be provided on the front panel 29 of the console 12. A coin tray 30 is mounted beneath the console 12 for cash payouts from the gaming machine 10. Of course, the machine could be a cashless gaming type machine in which wagering credits for play on the machine are provided via a card, or by connection via a network to a player's gaming account.

The display 14 shown in FIG. 1 is in the form of a video display unit, particularly a cathode ray tube screen device. Alternatively, the display 14 may be a liquid crystal display, plasma screen, any other suitable video display unit, or the visible portion of an electromechanical device. The top box 26 may also be a display, for example a video display unit, which may be the same type as the display 14, or a different type of display.

Figure 2:
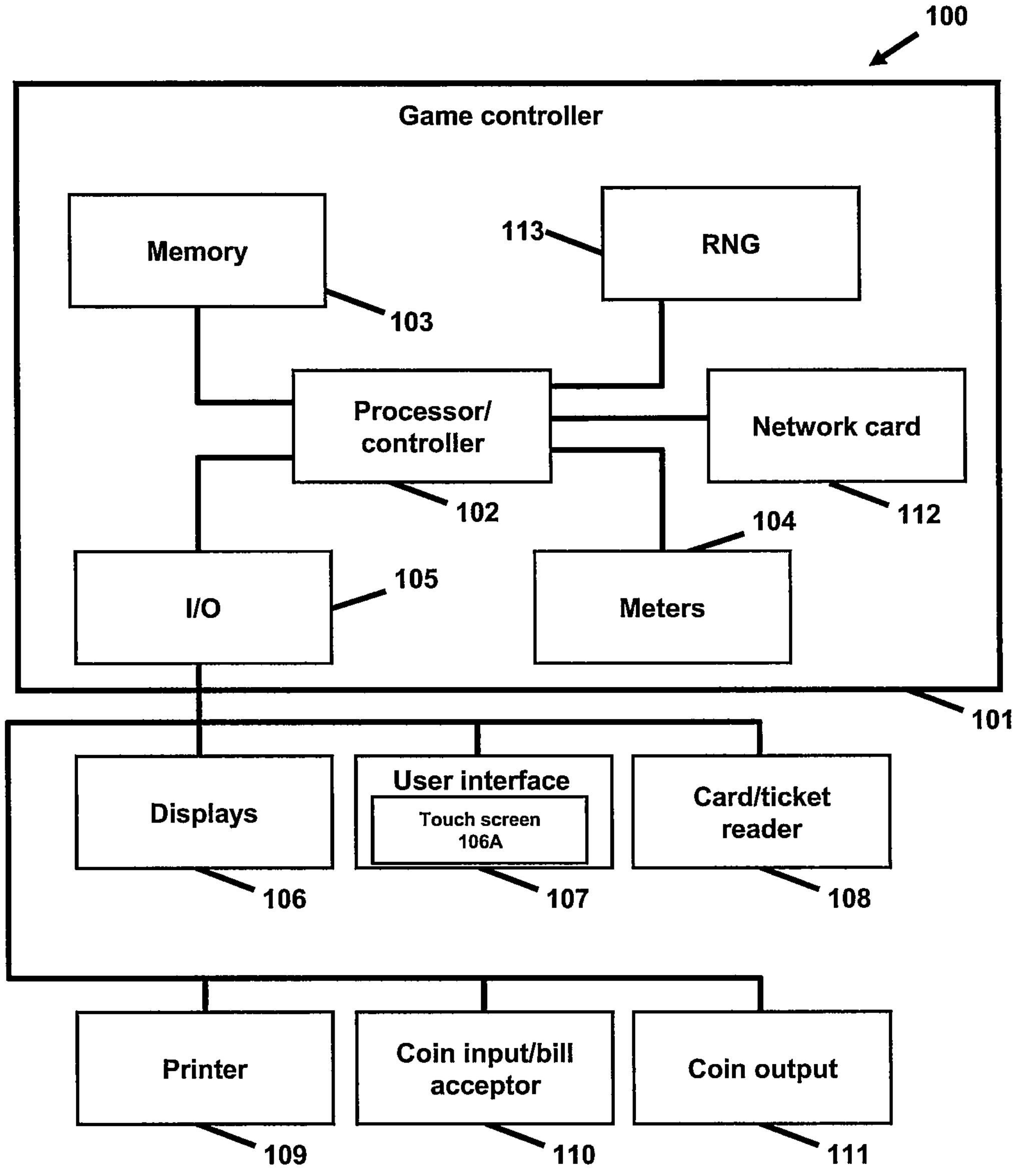
FIG. 2 shows a block diagram of gaming apparatus suitable for implementing an embodiment of the present invention.

FIG. 2 shows a block diagram of a gaming apparatus, generally referenced by arrow 100, suitable for implementing embodiments of the present invention. The gaming apparatus 100 may, for example, operate as a standalone gaming machine of the type shown in FIG. 1. However, the gaming apparatus 100 may alternatively operate as a networked gaming machine, communicating with other network devices, such as one or more servers or other gaming machines. The gaming apparatus 100 may have distributed hardware and software components that communicate with each other directly or through a network. Accordingly, different reference numerals have been used in FIG. 2 from FIG. 1 for components that may be equivalent.

The gaming apparatus 100 includes a game controller 101, which in the illustrated example includes a microprocessor, microcontroller, programmable logic device or other computational device 102. Instructions and data to control operation of the computational device 102 are stored in a memory 103, which is in data communication with the computational device 102. Typically, the gaming apparatus 100 will include both volatile and non-volatile memory and more than one of each type of memory, with such memories being collectively represented by the memory 103. In addition, the computational device 102 may include two or more computational devices that each perform computational functions and which may be located locally or remotely from each other. The instructions to cause the game controller 101 to implement embodiments of the present invention will be stored in the memory 103.

The gaming apparatus may include meters 104 for the purposes of regulatory compliance and also include an input/output (I/O) interface 105 for communicating with the peripheral devices of the gaming apparatus 100. The input/output interface 105 and/or the peripheral devices may be intelligent devices with their own memory for instructions and data.

In the example shown in FIG. 2, the peripheral devices that communicate with the controller are one or more displays 106, user interfaces 107, a card and/or ticket reader 108, a printer 109, a bill acceptor and/or coin input mechanism 110 and a coin output mechanism 111. Additional devices may be included in the gaming apparatus 100 or devices omitted as required. One or more of the peripheral devices may be an intelligent peripheral device, having its own memory containing instructions and data.

In addition, the gaming apparatus 100 may include a communications interface, for example a network card 112 to communicate with a network for such purposes as sending status information, accounting information and the like to a central controller, allowing communication from the central controller to the gaming apparatus 100 or for other purposes. In one embodiment, the functions of the computational device 102 may be split between a remote device and a local device, for example with game outcomes generated remotely and game graphics for the display 106 generated locally. In another embodiment, the peripheral devices only may be provided locally together with a network interface, in which case all, or nearly all intelligent devices may be located remotely of the display 106.

The game controller 101 may also include a random number generator 113, which generates a series of random numbers that determine the outcome of a series of random game events played as part of a game on the gaming machine 100.

Figure 3:
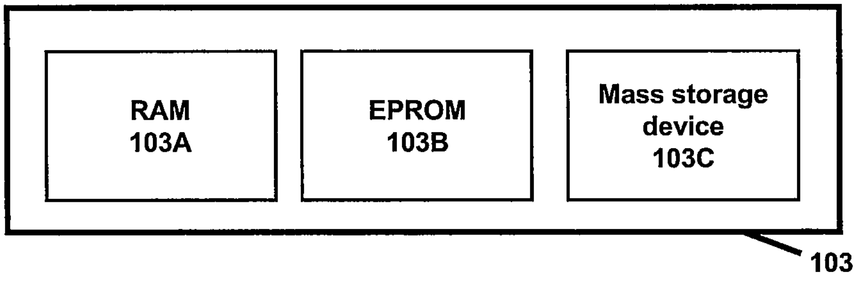
FIG. 3 shows a block diagram of components of the memory of the gaming apparatus represented in FIG. 2 in accordance with an embodiment of the present invention.

FIG. 3 shows an exemplary block diagram of the main components of the memory 103. The RAM 103A typically temporarily holds instructions and data related to the execution of game programs and communication functions performed by the computational controller 102. The EPROM 103B may be a boot ROM device and/or may contain system and game related code. The mass storage device 103C may be used to store game programs, the integrity of which may be verified and/or authenticated by the computational controller 102 using protected code from the EPROM 103B or elsewhere.

Figure 4:
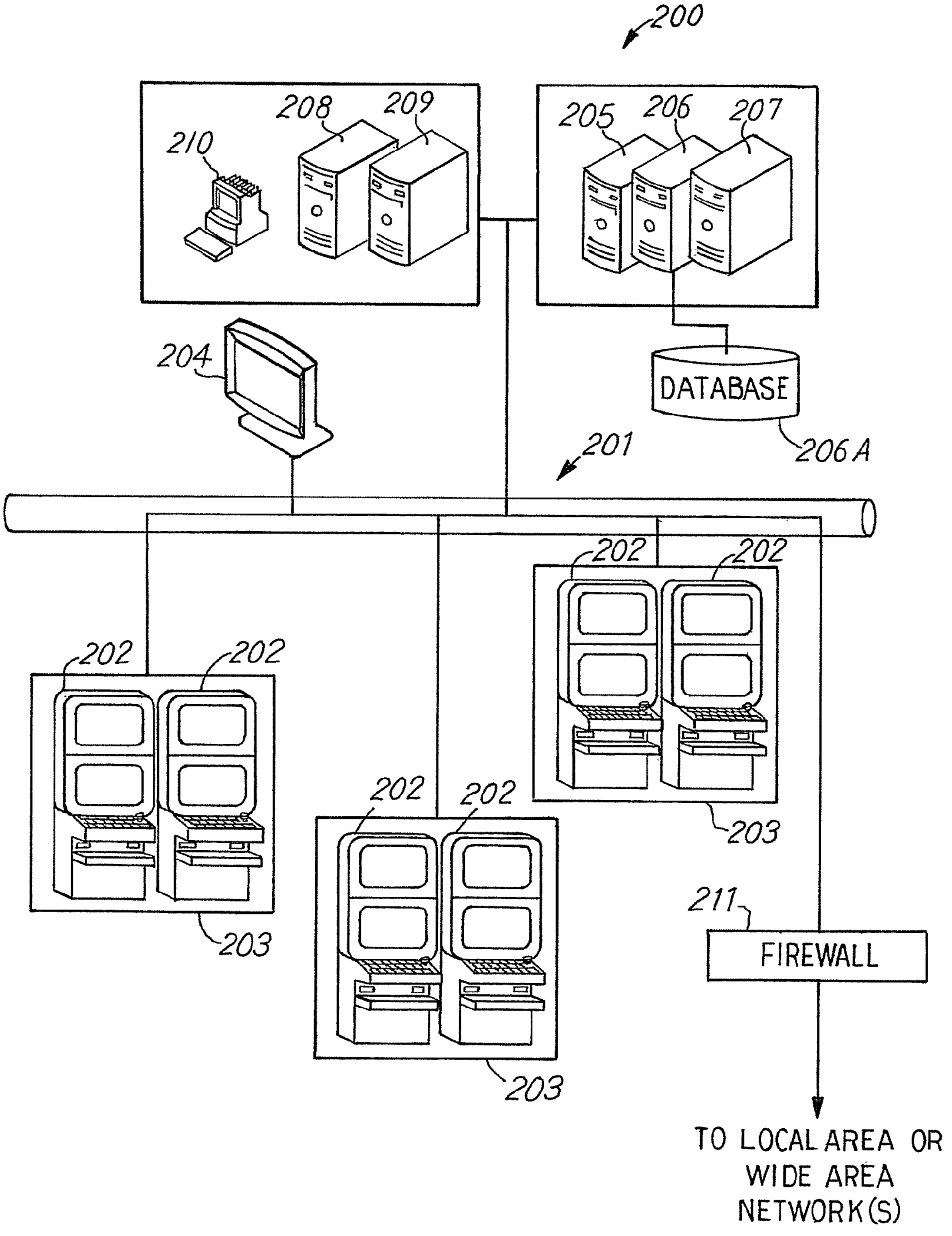
FIG. 4 shows diagrammatically, a network gaming system suitable for implementing an embodiment of the present invention.

FIG. 4 shows a gaming system 200. The gaming system 200 includes a network 201, which for example may be an Ethernet network. Gaming devices 202, shown arranged in three banks 203 of two gaming devices 202 in FIG. 4, are connected to the network 201. The gaming devices 202 may be gaming machines 10, as shown in FIG. 1 or form part or all of another gaming apparatus 100. Single gaming devices 202 and banks 203 containing three or more gaming devices 202 may also be connected to the network 201.

One or more displays 204 may also be connected to the network 201. The displays 204 may, for example, be associated with a bank 203 of gaming devices. The displays 204 may be used to display representations associated with game play on the gaming devices 202, and/or used to display other representations, for example promotional or informational material.

Servers may also be connected to the network 201. For example, a game server 205 may generate game outcomes for games played on the gaming devices 202, a database management server 206 may store game programs and associated data for downloading or access by the gaming devices 202 and a jackpot server 207 may control one or more jackpots associated with the gaming devices 202.

Further servers may be provided to assist in the administration of the gaming system 200, including for example a gaming floor management server 208, and a licensing server 209 to monitor the use of licenses to particular games. An administrator terminal 210 is provided to allow an administrator to run the network 201 and the devices connected to the network.

The gaming system 200 may communicate with other gaming systems, other local networks, for example a corporate network and/or a wide area network such as the Internet through a firewall 211.

A prior art form of popular gaming machine comprises a mechanical, electro mechanic or video spinning reel game in which spinning reels, or images of spinning reels, were displayed on a display and assorted payline associated with the images displayed on the display would pay a prize, depending on the nature of the wager made, which combinations were defined as winning combinations, and whether any special features, mystery bonuses, or the like have been awarded during a play of the game. One aspect of spinning reel games is that, for any reel, the symbols which make up that reel are set up in a particular fixed sequence. Thus, although the stopping position of a spinning reel might be a completely random event, typically defined by a number selected by a random number generator, the symbols which are displayed are generally displayed in exactly the same sequence defined by their relative positions on the reel.

In mechanical reels, the symbols are of course physical symbols illustrated on the periphery of the reel. In video spinning reel games the video sequence which shows a simulated spinning reel is also a set video sequence, and in particular, the symbols illustrated as the reel spins are illustrated in a predefined sequence.

The patent to Hagiwara previously referred to (U.S. Pat. No. Re 34,244) discloses an arrangement in which instead of providing one spinning reel for each column of the gaming machine, a separate spinning reel is provided for each position on the display. Thus, where a typical gaming machine might have say a 5 column by 3 row matrix of simple display positions and each column is defined by a separate spinning reel, Hagiwara discloses a 3×3 matrix arrangement (9 symbol positions) in which each one of those symbol positions is defined by a separate spinning reel.

It will be appreciated that Hagiwara allows the symbols shown in the symbol positions in a particular column to be independent of each other in that the symbols in each of the positions in the column are completely independent of the other symbols in the column since they are not part of the same symbol sequence. However, Hagiwara discloses an arrangement in which only the symbols on a predefined reel can be displayed in any of the symbol display positions.

Turning now to the illustration as show in FIGS. 5 to 8 of the drawings, where the form in which embodiments of the present invention might be implemented is illustrated.

Figure 5:
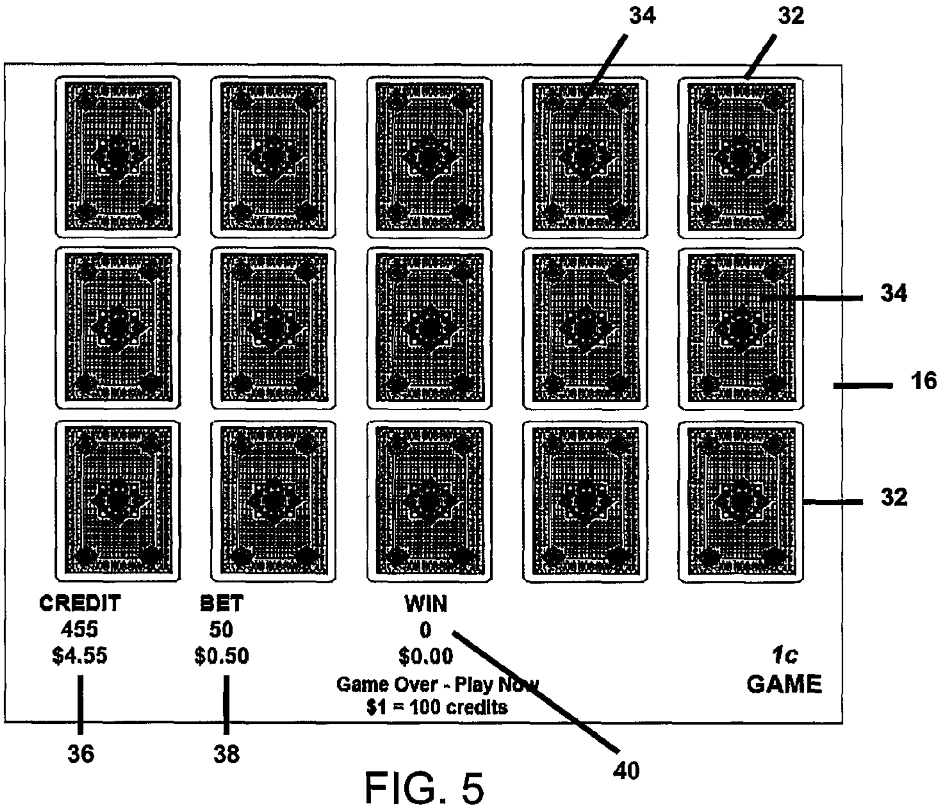
FIGS. 5-8 show illustrations of screen images of a game played in accordance with an embodiment of the present invention.

As shown in FIG. 5, the display 16 is shown comprising a matrix of 5 columns×3 rows of symbol positions 32. In this embodiment the symbol positions 32 are shown as face down cards 34 which when turned over reveal a symbol, and, depending on the symbols revealed a player will either win a prize or not, depending on the result of the wagering game played on the machine. A pay table (not shown) defines the prizes for particular symbol outcomes. The display 16 also includes a credit meter 36, a bet meter 38, and win meter 40. These three meters are standard in gaming machines of this type and need not be discussed here in any greater detail.

The selection of symbols to be displayed in each of the symbol display positions 34 is performed by a game controller 100 in the following manner. The game controller 100 is required to select symbols from a set of symbols stored in the memory of the game controller. That set of symbols will typically comprise a plurality of sub-sets of symbols, each a sub-set being a symbol of the same type. Thus, there may be say 10 symbol types in the set of symbols and each type or sub-set of symbols may comprise from one or more symbols of the same type. Preferably, the different types of symbols vary from a minimum number, which may be 1, to a maximum number which may be say 10 or more, thus defining less common and more common symbols in the set. Clearly the pay table may reflect the probability of different symbol combinations appearing on the display.

In the present embodiment the set of symbols from which symbols are selected for each column in the matrix of symbol positions is the same. However, this does not need to be so and it is quite possible to have different sets of symbols for each column in the matrix.

Figure 6:
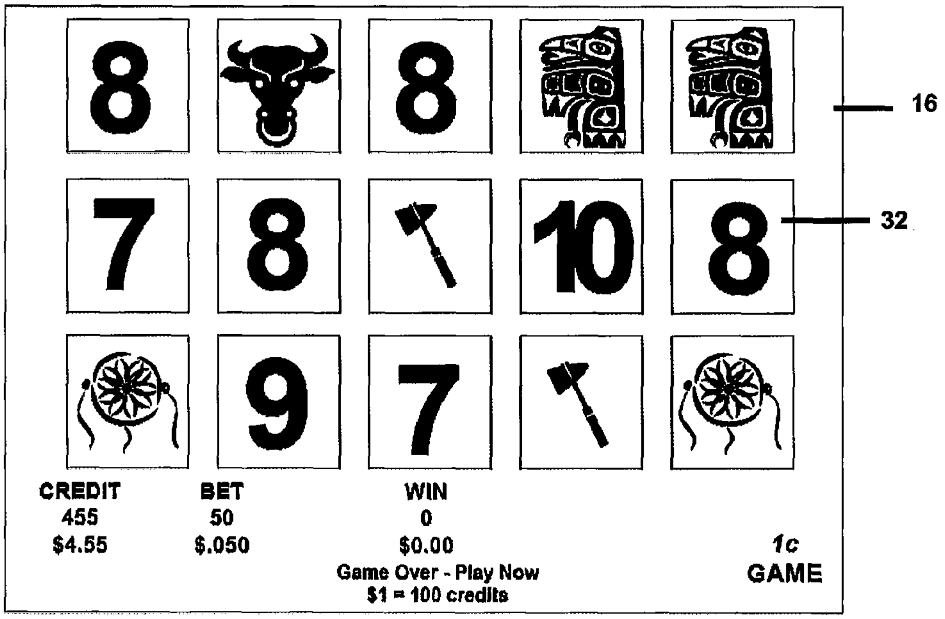

Symbol selection will typically take place as follows. For a particular column, the upper most symbol will preferably be selected first by the game controller 100 from a set of symbols. Thereafter, the middle symbol in the column of symbols will be selected, and thereafter the lower most symbol will be selected. However, the set of symbols will be changed prior to the selection of the middle symbol, and it will be changed again, prior the selection of the lower most symbol. The envisaged change is for all symbols of a particular type which is the same as the type of symbol selected for the upper most symbol position to be removed from the set prior to the selection of the middle symbol. The middle symbol will then be selected, and the set of symbols will then be changed again by removing all symbols of the type selected for the middle symbol position, prior to the selection of the lower most symbol. This arrangement ensures that there cannot be a description of the same symbol type in any column. FIG. 6 depicts the screen 16 after a player has bet a wager of 50 c and all of the down cards have been turned over to reveal the symbols selected by the game controller. It is envisaged that the cards will be turned over in a left to right flip movement so that each column of cards is sequentially turned over.

The player is then awarded prizes when adjacent symbols match, starting with the left most column. Thus, in the example shown in FIG. 6, the player will be awarded a prize of 20 credits on account of the fact that 3"8" symbols appear in the first three columns.

Figure 7:
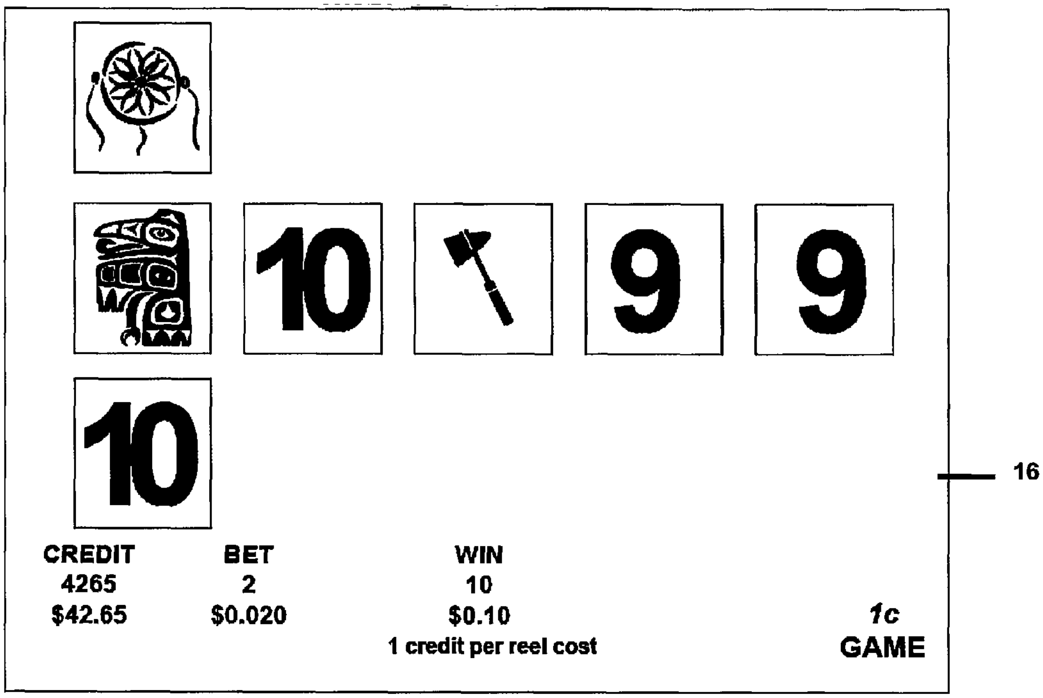
Figure 8:
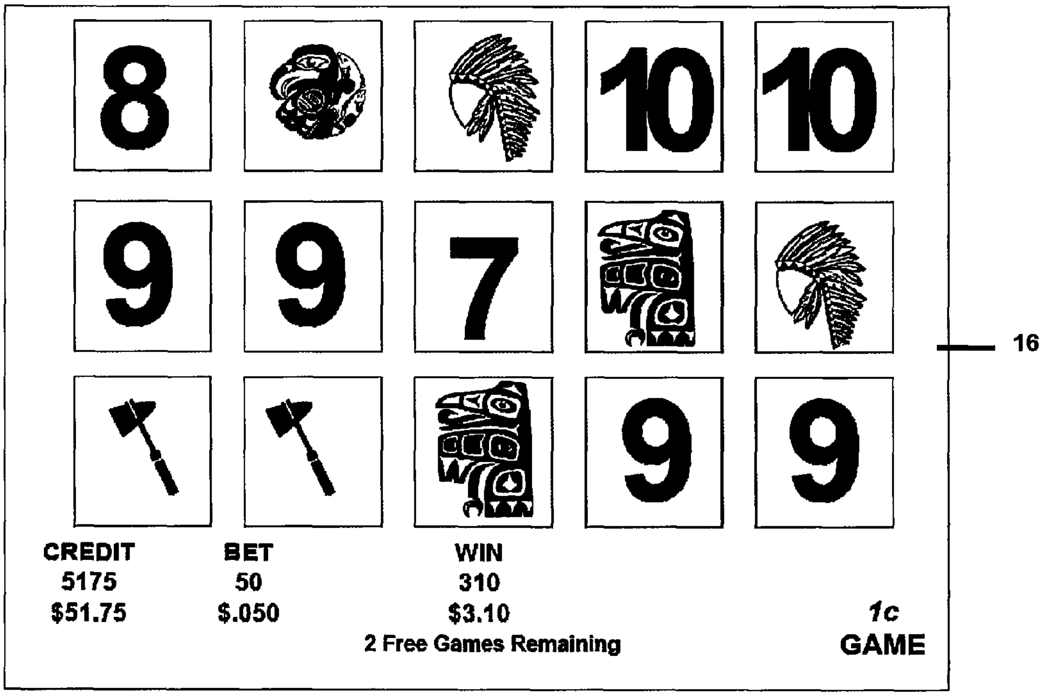

It is not essential that each column has the same number of symbol positions. One alternative is for the number of symbol positions in each column to vary, depending on the wager made by the player. FIG. 7 depicts an arrangement in which a player has made only a 2 credit wager and in this embodiment the player receives one column of 3 symbol positions, and four columns of a single symbol position. It will be appreciated that the chance of the player winning the prize with this FIG. 7 arrangement of symbols is far less than a chance of the player winning a prize with the arrangement shown in FIG. 6, but the chance of winning the prizes proportional to the size of the wager made and thus the return to player percentage on both play of the machine should be substantially the same.

In the particular example shown in FIG. 7, the player wins a bet of 2 credits on account of the fact that a pair of "10" symbols are shown in the first two columns of the display.

Where a player has elected not to wager on all of the possible combinations, as in the FIG. 7 example, rather than simply not show the non-selected symbol positions it would be possible to still show those positions, as face down cards, but not flip the cards over when the game is played. Alternatively the cards could be flipped over to reveal the symbols, but the non-selected symbols could be dulled or otherwise marked to indicate that they are not in play. The player would then be able to assess what prize would have been won had all symbols been selected.

The sequence in which cards are flipped or turned over can be varied. For example, all cards can be flipped simultaneously, rows can be flipped sequentially, columns can be flipped sequentially, or cards can be flipped sequentially.

Under specified trigger conditions the player may receive bonus or jackpot awards, or be awarded free games, or prize multipliers, or other additional awards. In the example shown in FIG. 8, a wild or special symbol has caused the prizes awarded by the machine to be multiplied by 3 and clearly, in known manner, a wide variety of triggering events can be built into the set of symbols such that when a triggering event appears in a symbol display position a bonus or jackpot is made available to the player.

It will be appreciated that the selection of symbols, and the display of those symbols, is quite different from that of a reel type game. The most significant difference is that the symbols are not linked together in a continuous loop with the random number generator defining which symbols in that loop will be displayed. Rather, the symbols in a set are each discrete, that is, independent of each other, and the game controller is able to vary that set of symbols between individual symbol selections, in accordance with the rules of the game. Thus, as described above, the set of symbols is varied by removing from the set those symbols of the same type as a symbol previously selected.

However, the symbols may be varied in different ways. The set may be varied, for example, by adding symbols to the set after a previous symbol has been selected. Thus, if a symbol was selected, rather than removing that symbol from the set, a symbol of identical type could be added to the set, thereby by ensuring that the set of symbols for selection in any symbol position is identical.

In addition, the set of symbols for each column may vary from column to column. Thus, a special symbol may be, for example, relatively frequent in say the first column, but relatively infrequent in the say the last column. This would then permit a large range of prizes to be awarded for different outcomes on the machine.

In certain embodiments, it is envisaged that the operation of the symbol selection could conveniently occur in the following manner. It will be appreciated that there will typically be a set of symbols from which symbols are to be selected for any column. There may, for example, be 50 symbols in the set, each symbol being allocated a number from 1 to 50. As previously mentioned, certain symbols will be more common than other symbols. For the symbols shown in FIG. 6, there may for example be twenty of the "8" symbols, ten of the "9" symbols, five of the "10" symbols and so on. Numbers 1 to 20 in the range of numbers to be allocated to those symbols would then be allocated to symbols "8". Numbers 21 to 30 would then be allocated to symbol "9", and numbers 31 to 35 would be allocated to the symbol "10". Clearly, the symbols including the special symbols, would be allocated the remaining numbers between 36 and 50 depending on the desired rarity of those symbols.

When a game is played, the random number generator would then select randomly a number between 1 and 50 for the first symbol position. If the number selected were say between 1 and 20, then the symbol "8" would be selected for the first symbol position. The game controller would then remove all of the remaining numbers 1 to 20 from the set of numbers so that for the second selection, the random number generator would only have numbers 21 to 50 to select for the second symbol position. Once that second symbol had been selected, all numbers which corresponded to that second selected symbol would be removed from the set of numbers, so that when the lower most symbol was selected the random number generator would only have the remaining numbers in the set available to it for selection. In this way no duplicated symbols would appear in any column.

The removal of symbols from the set is required in order to ensure no duplicates occur in any column but of course the game need not be played in this way. If the game designer chooses to allow duplicate symbols to appear in a column then the removal of symbols of the same type from the set of symbols need not occur. Indeed, other changes to the set of symbols could be made between the symbol selections such as, for example, adding in further symbols, altering certain symbols, or otherwise changing the set of symbols.

It will be appreciated that, since the set of symbols is dynamic, the display of individual symbols is straightforward. That is, the game controller simply selects the required symbol and that symbol is individually displayed, and no animation of a spinning reel need be shown.

Also, by making the set of symbols dynamic, a set may be changed by externally applied trigger events, such as, say, a jackpot period defined by the casino during which special symbols are added to the set of symbols for additional prizes.

By making the set of symbols dynamic and providing a manner for easily displaying individual symbols, the possibilities for creating a wide variety of games and awarding a wide variety of prizes, including jackpot and bonuses will be greatly enhanced.

While the foregoing description has been provided by way of example of the preferred embodiments of the present invention as presently contemplated, which utilise gaming apparatus and machines, those skilled in the relevant arts will appreciate that the present invention also may have application to internet gaming and/or have application to gaming over a telecommunications network, where handsets are used to display game outcomes and receive player inputs.

Where in the foregoing description reference has been made to integers having known equivalents, then those equivalents are hereby incorporated herein as if individually set forth.

Those skilled in the relevant arts will appreciate that modifications and additions to the embodiments of the present invention may be made without departing from the scope of the present invention.

It will be understood that the invention disclosed and defined in this specification extends to all alternative combinations of two or more of the individual features mentioned or evident from the text or drawings. All of these different combinations constitute various alternative aspects of the invention.

It will also be understood that the term "comprises" (or its grammatical variants) as used in this specification is equivalent to the term "includes" and should not be taken as excluding the presence of other elements or features.

The invention claimed is:

1. A gaming machine for playing a wagering game with a set of symbols, and wherein the set of symbols is dynamic, the gaming machine comprising:

a display having a plurality of display positions; and a game controller configured to provide a wagering game when a wager is staked on an outcome of the wagering game, to select symbols from the set of symbols, to display the selected symbols in the display positions of the display to form an outcome, and to award a prize when the displayed selected symbols includes a winning combination of symbols, and wherein said game controller being configured 1) to select at least two of the symbols sequentially, 2) to change at least two symbols of the set of symbols between at least two sequential symbol selections depending on a characteristic of a single symbol selected in the first of the at least two sequential symbol selections before the second of the at least two sequential symbol selections, and 3) to display the at least two sequentially selected symbols in vertically adjacent display positions.

2. The gaming machine of claim 1, wherein the set of symbols comprises a subset of symbols consisting of symbols that would define a said winning combination if displayed together in a predetermined arrangement of display positions, and wherein when said single symbol is a symbol from the subset of symbols, the symbols that are changed or removed comprise the symbols in the subset.

3. The gaming machine of claim 2, wherein the set of symbols comprises a plurality of said subsets of symbols and wherein when said single symbol is a symbol from one of the plurality subsets of symbols, the symbols that are changed comprise the symbols in the respective subset.

4. The gaming machine of claim 2, wherein the symbols that are changed consist of the symbols in the subset and no other symbols in the set of symbols are changed between the sequential selection of symbols.

5. The gaming machine of claim 1, wherein, in a change of the set of symbols, the game controller is further configured to add symbols to the set of symbols between the sequential selections.

6. The gaming machine of claim 1, wherein, in a change of the set of symbols, the game controller is further configured to alter characteristics of symbols in the set of symbols between selections.

7. The gaming machine of claim 1, wherein the characteristic of said single symbol includes an identity of said single symbol, and, in a change of the set of symbols, the game controller is further configured to remove all symbols of the identity from the set of symbols prior to the second of the at least two sequential symbol selections.

8. A method of providing a wagering game with a set of symbols on a gaming machine having a display having a plurality of display positions and a game controller, the method comprising:

providing a plurality of symbol display positions on the display;

receiving via said game controller a wager on an outcome of the wagering game;

in response to receiving the wager, randomly selecting by the game controller symbols from the set of symbols;

displaying via said game controller the selected symbols in the display positions; and in response to the displayed selected symbols, awarding a prize when the outcome is a winning combination of symbols;

wherein said selecting includes 1) selecting at least two of the symbols sequentially, and 2) changing at least two symbols of the set of symbols between at least two sequential symbol selections depending on a characteristic of a single symbol selected in the first of the at least two sequential symbol selections before the second of the two sequential symbol selections, and wherein said displaying the selected symbols in the display positions includes displaying the at least two sequentially selected symbols in vertically adjacent display positions.

9. The method of claim 8, wherein the set of symbols comprises a subset of symbols consisting of symbols that would define a said winning combination if displayed together in a predetermined arrangement of display positions and wherein when said single symbol is a symbol from the subset of symbols, said changing includes changing the symbols that comprise the symbols in the subset.

10. The method of claim 9, wherein said changing includes changing the symbols that consist of the symbols in the subset and no other symbols in the set of symbols between the sequential selection of symbols.

11. The method of claim 8, wherein the set of symbols comprises a plurality of subsets of symbols that would define a said winning combination if displayed together in a predetermined arrangement of display positions, and wherein when said single symbol is a symbol from one of the plurality subsets of symbols, said changing includes changing the symbols that comprise the symbols in the respective subset.

12. The method of claim 8, wherein said changing comprises adding symbols to the set of symbols between the sequential selections.

13. The method of claim 8, wherein said changing comprises altering characteristics of symbols in the set of symbols between selections.

14. The method of claim 8, wherein the characteristic of said single symbol includes an identity of said single symbol, and said changing of the set of symbols includes removing all symbols of the identity from the set of symbols prior to the second of the at least two sequential symbol selections.

* * * * *